(12) United States Patent
Bazemore et al.

(10) Patent No.: US 10,656,454 B2
(45) Date of Patent: May 19, 2020

(54) ANTI-GLARE SUBSTRATES WITH LOW SPARKLE, DOI AND TRANSMISSION HAZE

(71) Applicant: CORNING INCORPORATED, Corning, NY (US)

(72) Inventors: Brandon Allen Bazemore, Corning, NY (US); Yuhui Jin, Painted Post, NY (US); Jun Hou, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 377 days.

(21) Appl. No.: 15/506,053

(22) PCT Filed: Sep. 4, 2015

(86) PCT No.: PCT/US2015/048510
§ 371 (c)(1),
(2) Date: Feb. 23, 2017

(87) PCT Pub. No.: WO2016/040151
PCT Pub. Date: Mar. 17, 2016

(65) Prior Publication Data
US 2019/0107751 A1  Apr. 11, 2019

Related U.S. Application Data

(60) Provisional application No. 62/047,254, filed on Sep. 8, 2014.

(51) Int. Cl.
*G02F 1/1335* (2006.01)
*C03C 15/00* (2006.01)
(Continued)

(52) U.S. Cl.
CPC ........ *G02F 1/133502* (2013.01); *C03C 3/085* (2013.01); *C03C 3/087* (2013.01);
(Continued)

(58) Field of Classification Search
CPC . G02F 1/133502; C03C 15/00; C03C 21/002; C03C 3/085; C03C 23/0075
See application file for complete search history.

(56) References Cited

U.S. PATENT DOCUMENTS 8,312,739 B2  11/2012  Lee et al.
8,561,429 B2  10/2013  Allan et al.
(Continued)

FOREIGN PATENT DOCUMENTS

CN  101314522 A  12/2008
CN  102432185 A  5/2012
(Continued)

OTHER PUBLICATIONS

English Translation of CN201580060100.6 First Office Action dated May 17, 2019, China Patent Office, 10 Pgs.
(Continued)

*Primary Examiner* — Nahida Sultana
(74) *Attorney, Agent, or Firm* — Kevin M. Johnson (57) ABSTRACT

Embodiments of anti-glare substrates and articles including the same are disclosed. In one or more embodiments, the anti-glares substrate includes a textured surface with a plurality of features having an average cross-sectional dimension of about 30 micrometers or less. The substrate or article exhibits a transmission haze of 10% or less, a PPDr of about 7% or less or 6% or less, and a DOI of about 80 or less. Method for forming the anti-glare substrates are also disclosed and include etching a surface of a substrate with an etchant having low water solubility to provide an etched surface, and removing a portion of the etched surface. The method includes generating a plurality of insoluble crystals (e.g., any one or more of $K_2SiF_6$ and $K_3AlF_6$) on the surface while etching the surface. The etchant may include a potassium salt, an organic solvent and a fluoride containing acid.

15 Claims, 7 Drawing Sheets

(51) Int. Cl.
*C03C 23/00* (2006.01)
*C03C 3/085* (2006.01)
*G02B 5/02* (2006.01)
*C03C 3/091* (2006.01)
*C03C 3/087* (2006.01)
*C03C 21/00* (2006.01)

(52) U.S. Cl.
CPC .............. *C03C 3/091* (2013.01); *C03C 15/00* (2013.01); *C03C 21/002* (2013.01); *C03C 23/0075* (2013.01); *G02B 5/0221* (2013.01); *G02B 5/0294* (2013.01)

(56) References Cited

U.S. PATENT DOCUMENTS

| | | |
|---|---|---|
| 8,598,771 B2 | 12/2013 | Carlson et al. |
| 2010/0246016 A1 | 9/2010 | Carlson et al. |
| 2011/0062849 A1 | 3/2011 | Carlson et al. |
| 2017/0139082 A1* | 5/2017 | Takai ........................ B32B 7/02 |
| 2017/0183257 A1* | 6/2017 | Apitz .................... C03C 21/008 |
| 2017/0217825 A1* | 8/2017 | Hasegawa ............... C03C 17/32 |
| 2017/0233287 A1* | 8/2017 | Li ............................ C03C 3/091 428/172 |
| 2017/0276995 A1* | 9/2017 | Sato ........................ C03C 19/00 |
| 2018/0022630 A1* | 1/2018 | Fukushi .............. C03B 23/0252 65/30.14 |
| 2018/0072613 A1* | 3/2018 | Minorikawa ........... C03C 15/00 |
| 2018/0282207 A1* | 10/2018 | Fujii ....................... C03C 19/00 |

FOREIGN PATENT DOCUMENTS

| | | |
|---|---|---|
| JP | 2013139381 | 7/2013 |
| JP | 2013139381 A | 7/2013 |
| WO | 2012118594 | 9/2012 |
| WO | 2012166449 | 12/2012 |

OTHER PUBLICATIONS

Gollier et al., Display Sparkle Measurement and Human Response, SID 2013 Digest, p. 295-297.

Patent Cooperation Treaty International Notification of Transmittal of the International Search Report and the Written Opinion of the International Searching Authority, international application No. PCT/US2015/048510: dated Nov. 12, 2015, 13 pages.

"Physical Constants of Inorganic Compounds", in *CRC Handbook of Chemistry and Physics, Internet Version 2005*, David R. Lide, ed., <http://www.hbcpnetbase.com>, CRC Press, Boca Raton, FL, 2005, at p. 4-76.

* cited by examiner

ANTI-GLARE SUBSTRATES WITH LOW SPARKLE, DOI AND TRANSMISSION HAZE

CROSS-REFERENCE TO RELATED APPLICATIONS

This application is a national stage entry of International Patent Application Serial No. PCT/US15/48510 filed on Sep. 4, 2015, which claims the benefit of priority under 35 U.S.C. § 119 of U.S. Provisional Application Ser. No. 62/047,254 filed on Sep. 8, 2014 the content of which is relied upon and incorporated herein by reference in its entirety.

BACKGROUND

The disclosure relates to substrates exhibiting anti-glare properties and more particularly to substrates exhibiting low sparkle, low distinctiveness of image (DOI), and low transmission haze.

Advances in consumer electronic technology has necessitated improvements in various cover substrate properties. One such area for improvement is anti-glare surfaces for consumer electronic devices such as smart (mobile) phones, tablets, electronic readers, displays and TVs.

Known anti-glare surfaces often have textured surfaces that are formed by forming crystals on the surface of the substrate and etching portions of the substrate not covered by the crystals. In some instances, hydrofluoric acid (HF), ammonium bifluoride ($NH_4HF_2$), propylene glycol (PG), and a mineral acids (such as sulfuric acid, $H_2SO_4$) are utilized to form such anti-glare surfaces on glass substrates.

For consumer electronic applications, known anti-glare surfaces can exhibit sparkle (or a grainy appearance) at low transmittance haze levels (e.g., about 10% or less). Display "sparkle" is a phenomenon that can occur when anti-glare or light scattering surfaces are incorporated into a display system. Sparkle is associated with a very fine grainy appearance that can appear to have a shift in the pattern of the grains with changing viewing angle of the display. This type of sparkle is observed when pixelated displays such as LCDs are viewed through an antiglare surface. Such sparkle is of a different type and origin from "sparkle" or "speckle" that has been observed and characterized in projection or laser systems As displays exhibit higher definition and more pixels are assembled at higher densities, the reduction of sparkle becomes more important. Accordingly, there is a need for anti-glare surfaces that exhibit low sparkle, while still exhibiting low DOI and low transmission haze.

SUMMARY

A first aspect of this disclosure pertains to a method of forming an antiglare surface that includes etching a portion of a surface of a substrate with an etchant to provide an etched surface, and removing a portion of the etched surface to provide the anti-glare surface. The resulting substrate with the anti-glare surface exhibits a transmission haze 10% or less, and a PPDr of about 6% or less, and the anti-glare surface exhibits a DOI of about 80 or less. The resulting the anti-glare surface may include a textured surface with plurality of concave features having an opening facing outwardly from the surface. The opening may have an average cross-sectional dimension of about 30 micrometers or less.

In one or more embodiments, the method includes generating a plurality of insoluble crystals on the surface while etching a portion of the surface with the etchant (which may be applied by spraying). The etchant may exhibit a water solubility of about 50 g/100 g water or less. In some instances, the insoluble crystals include potassium and may include any one or more of $K_2SiF_6$ and $K_3AlF_6$. In some other instances, the insoluble crystals exhibit a water solubility of less than about 10 g/100 g water.

In one or more embodiments, removing a portion of the etched surface includes removing a thickness up to about 100 micrometers of the surface (e.g., from about 40 micrometers to about 100 micrometers). The thickness may be removed by exposing the surface to a chemical polishing solution. In some instances, the etchant is removed prior to removing the portion of the etched surface.

In one or more embodiments, the etchant includes a potassium salt, which may be present in an amount in the range from about 1 wt % to about 20 wt % or from about 5 wt % to about 15 wt %. The potassium salt may include any one or more of potassium chloride (KCl), potassium nitrate ($KNO_3$), potassium sulfate ($K_2SO_4$) and potassium acetate. The etchant may also include an organic solvent and a fluoride containing acid. The organic solvent may be present in an amount in the range from about 0 wt % to about 40 wt % and can include a water miscible organic solvent. In one or more embodiments, the fluoride containing acid is present in an amount in the range from about 0.5 wt % to about 6 wt % and may include any one or more of hydrofluoric acid (HF) and ammonium bifluoride ($NH_4HF_2$). In some examples, the is substantially free of ammonium salt. In other examples, the etchant may include ammonium fluoride ($NH_4F$), an insoluble particle, a surfactant or a combination thereof.

The method may utilize a substrate that may be amorphous or crystalline. Examples of suitable amorphous substrates include glasses such as soda lime glass, alkali aluminosilicate glass, alkali containing borosilicate glass and alkali aluminoborosilicate glass. In some instances, the glass may be chemically strengthened and may include a compressive stress (CS) layer with a surface CS of at least 250 MPa extending within the chemically strengthened glass from a surface of the glass to a depth of layer (DOL) of at about 10 μm or greater.

A second aspect of this disclosure pertains to a substrate that exhibits low sparkle (in terms of low pixel power deviation reference or PPDr), low DOI and low transmission haze. In one or more embodiments, the substrate includes an anti-glare surface that includes a textured surface having features having an average cross-sectional dimension of about 30 micrometers (μm) or less. In some instances, the features include a Rsk value in the range from about 1 to about −1. In some embodiments, the article (or the textured surface thereof) exhibits a transmission haze of 10% or less, a PPDr of less than about 7% (or about 6% or less) and a DOI of about 80 or less.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference will now be made in detail to various embodiment(s) of this disclosure A first aspect of this disclosure pertains to a substrate exhibiting anti-glare properties and articles including the same. Specifically, the anti-glare substrate exhibits a transmission haze 10% or less, a PPDr of about 6% or less and a DOI of about 80 or less, as measured on the surface including the anti-glare surface (or textured or roughened surface).

Figure 1:
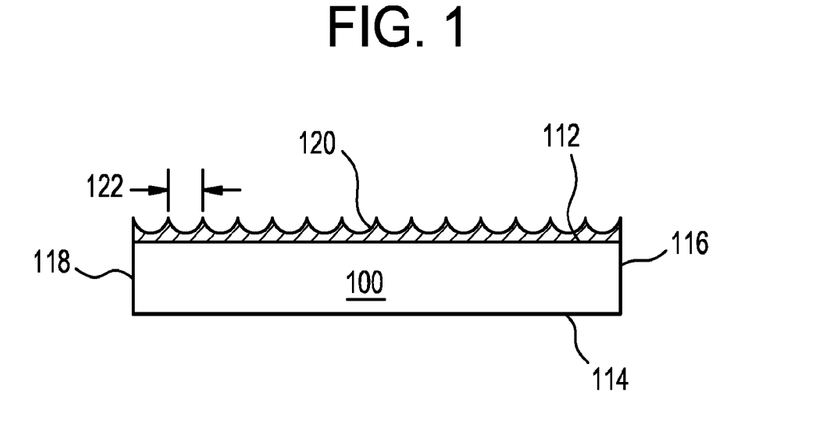
FIG. 1 is a side view illustration of one embodiment.

Referring to FIG. 1, in one or more embodiments, the substrate 100 includes opposing major surfaces 112, 114 and opposing minor surfaces 116, 118. In some embodiments, at least one surface (e.g., a major surface) includes a texture (referred to herein as a textured surface 120) with a plurality of features 122. The texture may extend across a portion of the surface, the entire surface or on more than one surface. The texture may be referred as roughened. The features 120 may be described as concave shape extending into the substrate from the surface with an opening at the surface, facing outwardly from the surface, as shown in FIG. 1.

Unless otherwise stated, the anti-glare performance of the substrate 100 in terms of DOI is measured on the surface with the texture or the plurality of features 122, in reflected mode (i.e., without taking into account the other surfaces of the substrate). PPDr and transmission haze performance is in terms of the entire substrate, since these values are measured in the transmitted mode.

In one or more embodiments, features of the textured surface 120 may have an average cross-sectional dimension of about 30 micrometers or less. The average cross-sectional dimension may be measured at the opening on the surface. In some embodiments, the features 122 have an average cross-sectional dimension in the range from about 10 micrometers to about 30 micrometers, from about 10 micrometers to about 28 micrometers, from about 10 micrometers to about 26 micrometers, from about 10 micrometers to about 24 micrometers, from about 10 micrometers to about 22 micrometers, from about 10 micrometers to about 20 micrometers, from about 12 micrometers to about 30 micrometers, from about 14 micrometers to about 30 micrometers, from about 16 micrometers to about 30 micrometers, from about 18 micrometers to about 30 micrometers, from about 20 micrometers to about 30 micrometers, from about 15 micrometers to about 25 micrometers, from about 17 micrometers to about 25 micrometers, from about 20 micrometers to about 25 micrometers, or from about 20 micrometers to about 22 micrometers. As used herein, the term "longest cross-sectional dimension" refers to the longest single dimension of the features. Thus, to clarify, when a feature is circular, the longest cross-sectional dimension is its diameter; when a feature is oval-shaped, the longest cross-sectional dimension is the longest diameter of the oval; and when a feature is irregularly-shaped, the longest cross-sectional dimension is the line between the two farthest opposing points on its perimeter. The term "average" when used with "longest cross-sectional dimension" includes the average of the measured longest cross-sectional dimensions of least 20 different features on the same sample.

In one or more embodiments, the substrate exhibits low sparkle which may be characterized by a pixel power deviation reference or PPDr of about 7% or less, about 6.5% or less, about 6% or less, about 5.5% or less, about 5% or less, about 4.5% or less, about 4% or less, about 3.5% or less, or about 3% or less. As used herein, the terms "pixel power deviation referenced" and "PPDr" refer to the quantitative measurement for display sparkle. Unless otherwise specified, PPDr is measured using a display arrangement that includes an edge-lit LCD screen (twisted nematic LCD) having a native sub-pixel pitch of 60 μm×180 μm and a sub-pixel opening window size of about 44 μm×about 142 μm. The front surface of the LCD screen had a glossy, anti-reflection type linear polarizer film. To determine PPDr of a display system or an anti-glare surface that forms a portion of a display system, a screen is placed in the focal region of an "eye-simulator" camera, which approximates the parameters of the eye of a human observer. As such, the camera system includes an aperture (or "pupil aperture") that is inserted into the optical path to adjust the collection angle of light, and thus approximate the aperture of the pupil of the human eye. In the PPDr measurements described herein, the iris diaphragm subtends an angle of 18 milliradians.

PPDr measurements can be distinguished from PPD measurements used to characterize known anti-glare surfaces. PPDr includes a normalized standard deviation of pixel power and is more fully described in J. Gollier et al., "Display sparkle measurement and human response," SID-Symposium of Technical Papers 44, No. 1, 295-297 (2013). To calculate the PPD contribution from the display alone, the pixel power variation the emissive display without the anti-glare surface is removed to provide a PPDr measurement (denoting a referenced measurement). Generally, a first image of the bare display is taken and used as a reference for the image taken with the test sample containing the anti-glare surface. The boundaries between adjacent pixels are calculated by summing the lines then rows in the image and determining the minima. For very noisy images the locations of the integrated regions may need to be estimated using the knowledge that the pixel pitch in the emissive display is constant. The background counts observed in the dark regions between the pixels is subtracted from the image to remove camera dark counts or other scattered light within the display. Total power within each pixel is then integrated and normalized by dividing by the pixel powers from the reference image. The standard deviation of the distribution of pixel powers is then calculated to give the PPDr value.

More specifically, in measuring PPDr, a uniform green patch of an LCD pixel is used as a source. Only the green sub-pixels are illuminated with a minimum measurement area of about 20×20 LCD pixels. Test images ($T_{ij}$) and reference images ($R_{ij}$) are acquired. The reference image removes non-uniformity in source intensity distribution. The image of the LCD pixels as viewed through the iris is collected by a CCD (charge-coupled device) camera having at least about 20 CCD pixels per LCD pixel. Background values (bg) are also determined to remove contributions from stray light and dark counts. The PPDr value is determined by equations (1) and (2).

$$A_{ij}=(T_{ij}-bg)/(R_{ij}-bg) \qquad (1)$$

$$PPDr=St.Dev.[A_{ij}]*100 \qquad (2)$$

PPDr measurements may be taken at 0° and at 90°. PPDr values refer to the mathematical average of these measurements.

In some embodiments, the anti-glare surface exhibits a 20° distinctness of image (DOI) of less than about 85. In some embodiments, the DOI of the anti-glare surface is less than about 80, less than about 60 or less than about 40. As used herein, the term "distinctness of image" is defined by method A of ASTM procedure D5767 (ASTM 5767), entitled "Standard Test Methods for Instrumental Measurements of Distinctness-of-Image Gloss of Coating Surfaces," the contents of which are incorporated herein by reference in their entirety. In accordance with method A of ASTM 5767, substrate reflectance factor measurements are made on the anti-glare surface at the specular viewing angle and at an angle slightly off the specular viewing angle. The values obtained from these measurements are combined to provide a DOI value. In particular, DOI is calculated according to the equation $$DOI = \left[1 - \frac{Ros}{Rs}\right] \times 100, \qquad (3)$$

where Ros is the relative reflection intensity average between 0.2° and 0.4 away from the specular reflection direction, and Rs is the relative reflection intensity average in the specular direction (between +0.05° and −0.05°, centered around the specular reflection direction). If the input light source angle is +20° from the sample surface normal (as it is throughout this disclosure), and the surface normal to the sample is taken as 0°, then the measurement of specular reflected light Rs is taken as an average in the range of about −19.95° to −20.05°, and Ros is taken as the average reflected intensity in the range of about −20.2° to −20.4° (or from −19.6° to −19.8°, or an average of both of these two ranges). As used herein, DOI values should be directly interpreted as specifying a target ratio of Ros/Rs as defined herein. In some embodiments, the anti-glare surface has a reflected scattering profile such that >95% of the reflected optical power is contained within a cone of +/−10°, where the cone is centered around the specular reflection direction for any input angle.

In some embodiments, the anti-glare surface described herein has a transmission haze value of about 10% or less. In some embodiments, the transmission haze of the transparent glass sheet about 8% or less, about 6% or less or about 5% or less. As used herein, the terms "transmission haze" and "haze" refer to the percentage of transmitted light scattered outside an angular cone of about ±2.5° in accordance with ASTM procedure D1003. For an optically smooth surface, transmission haze is generally close to zero.

In some embodiments, the anti-glare surface exhibits an RMS roughness of about 200 nanometers (nm) or greater. In some embodiments, the anti-glare surface exhibits a RMS roughness value of about 210 nanometers or greater, about 220 nanometers or greater, about 230 nanometers or greater, about 240 nanometers or greater, about 250 nanometers or greater, about 300 nanometers or greater, about 350 nanometers or greater, about 400 nanometers or greater, about 450 nanometers or greater or about 500 nanometers or greater.

In some instances, the anti-glare surface exhibits a skewness (Rsk) value in the range from about −1 to about for from about −0.5 to about 0.5. Without being bound by theory, surfaces with a Rsk value of greater than 1 are less durable in terms of scratch resistance than surfaces with a Rsk value of about 1 or less and surfaces with a Rsk value of less than about −1 may have reduced strength than surfaces having an Rsk value of about −1 or greater.

The substrate used to form the anti-glare surface may be inorganic and may include an amorphous substrate, a crystalline substrate or a combination thereof. In one or more embodiments, the substrate may be amorphous and may include glass, which may be strengthened or non-strengthened. Examples of suitable glass include soda lime glass, alkali aluminosilicate glass, alkali containing borosilicate glass and alkali aluminoborosilicate glass. In one or more alternative embodiments, the substrate may include crystalline substrates such as glass ceramic substrates (which may be strengthened or non-strengthened) or may include a single crystal structure, such as sapphire. In one or more specific embodiments, the substrate includes an amorphous base (e.g., glass) and a crystalline cladding (e.g., sapphire layer, a polycrystalline alumina layer and/or or a spinel ($MgAl_2O_4$) layer).

The substrate may be substantially planar or sheet-like, although other embodiments may utilize a curved or otherwise shaped or sculpted substrate. The substrate may be substantially optically clear, transparent and free from light scattering. In such embodiments, the substrate may exhibit an average light transmission over the optical wavelength regime of about 85% or greater, about 86% or greater, about 87% or greater, about 88% or greater, about 89% or greater, about 90% or greater, about 91% or greater or about 92% or greater. In one or more alternative embodiments, the substrate may be opaque or exhibit an average light transmission over the optical wavelength regime of less than about 10%, less than about 9%, less than about 8%, less than about 7%, less than about 6%, less than about 5%, less than about 4%, less than about 3%, less than about 2%, less than about 1%, or less than about 0%. The substrate may optionally exhibit a color, such as white, black, red, blue, green, yellow, orange etc.

Additionally or alternatively, the physical thickness of the substrate may vary along one or more of its dimensions for aesthetic and/or functional reasons. For example, the edges of the substrate may be thicker as compared to more central regions of the substrate 100. The length, width and physical thickness dimensions of the substrate may also vary according to the application or use.

The substrate may be provided using a variety of different processes. For instance, where the substrate includes an amorphous substrate such as glass, various forming methods can include float glass processes and down-draw processes such as fusion draw and slot draw.

Once formed, a substrate may be strengthened to form a strengthened substrate. As used herein, the term "strengthened substrate" may refer to a substrate that has been chemically strengthened, for example through ion-exchange of larger ions for smaller ions in the surface of the substrate. However, other strengthening methods known in the art, such as thermal tempering, or utilizing a mismatch of the coefficient of thermal expansion between portions of the substrate to create compressive stress and central tension regions, may be utilized to form strengthened substrates.

Where the substrate is chemically strengthened by an ion exchange process, the ions in the surface layer of the substrate are replaced by—or exchanged with—larger ions having the same valence or oxidation state. Ion exchange processes are typically carried out by immersing a substrate in a molten salt bath containing the larger ions to be exchanged with the smaller ions in the substrate. It will be appreciated by those skilled in the art that parameters for the ion exchange process, including, but not limited to, bath composition and temperature, immersion time, the number of immersions of the substrate in a salt bath (or baths), use of multiple salt baths, additional steps such as annealing, washing, and the like, are generally determined by the composition of the substrate and the desired compressive stress (CS), depth of compressive stress layer (or depth of layer) of the substrate that result from the strengthening operation. By way of example, ion exchange of alkali metal-containing glass substrates may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass substrates are immersed in multiple ion exchange baths, with washing and/or annealing steps between immersions, are described in U.S. patent application Ser. No. 12/500,650, filed Jul. 10, 2009, by Douglas C. Allan et al., entitled "Glass with Compressive Surface for Consumer Applications" and claiming priority from U.S. Provisional Patent Application No. 61/079,995, filed Jul. 11, 2008, in which glass substrates are strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass substrates are strengthened by ion exchange in a first bath is diluted with an effluent ion, followed by immersion in a second bath having a smaller concentration of the effluent ion than the first bath. The contents of U.S. patent application Ser. No. 12/500,650 and U.S. Pat. No. 8,312,739 are incorporated herein by reference in their entirety.

The degree of chemical strengthening achieved by ion exchange may be quantified based on the parameters of central tension (CT), surface CS, and depth of layer (DOL). Surface CS may be measured near the surface or within the strengthened glass at various depths. A maximum CS value may include the measured CS at the surface ($CS_s$) of the strengthened substrate. The CT, which is computed for the inner region adjacent the compressive stress layer within a glass substrate, can be calculated from the CS, the physical thickness t, and the DOL. CS and DOL are measured using those means known in the art. Such means include, but are not limited to, measurement of surface stress (FSM) using commercially available instruments such as the FSM-6000, manufactured by Luceo Co., Ltd. (Tokyo, Japan), or the like, and methods of measuring CS and DOL are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass substrate. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method. The relationship between CS and CT is given by the expression (1):

$$CT = (CS \cdot DOL)/(t - 2\ DOL) \qquad (1),$$

wherein t is the physical thickness (μm) of the glass article. In various sections of the disclosure, CT and CS are expressed herein in megaPascals (MPa), physical thickness t is expressed in either micrometers (μm) or millimeters (mm) and DOL is expressed in micrometers (μm).

In one embodiment, a strengthened substrate can have a surface CS of 250 MPa or greater, 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. The strengthened substrate may have a DOL of 10 μm or greater, 15 μm or greater, 20 μm or greater (e.g., 25 μm, 30 μm, 35 μm, 40 μm, 45 μm, 50 μm or greater) and/or a CT of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened substrate has one or more of the following: a surface CS greater than 500 MPa, a DOL greater than 15 μm, and a CT greater than 18 MPa.

Example glasses that may be used in the substrate may include alkali aluminosilicate glass compositions or alkali aluminoborosilicate glass compositions, though other glass compositions are contemplated. Such glass compositions are capable of being chemically strengthened by an ion exchange process. One example glass composition comprises $SiO_2$, $B_2O_3$ and $Na_2O$, where $(SiO_2 + B_2O_3) \geq 66$ mol. %, and $Na_2O \geq 9$ mol. %. In an embodiment, the glass composition includes at least 6 wt. % aluminum oxide. In a further embodiment, the substrate includes a glass composition with one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass compositions used in the substrate can comprise 61-75 mol. % $SiO2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the substrate comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. %

CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. %≤($Li_2O+Na_2O+K_2O$)≤20 mol. % and 0 mol. %≤(MgO+CaO)≤10 mol. %.

A still further example glass composition suitable for the substrate comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. %≤($Li_2O+Na_2O+K_2O$)≤18 mol. % and 2 mol. %≤(MgO+CaO)≤7 mol. %.

In a particular embodiment, an alkali aluminosilicate glass composition suitable for the substrate comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $$\frac{Al_2O_3 + B_2O_3}{\sum modifiers} > 1,$$

where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\sum modifiers} > 1.$$

In still another embodiment, the substrate may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %≤$SiO_2$–$B_2O_3$+CaO≤69 mol. %; $Na_2O+K_2O+B_2O_3+MgO+CaO+SrO$>10 mol. %; 5 mol. %≤MgO+CaO+SrO≤8 mol. %; ($Na_2O+B_2O_3$)–$Al_2O_3$≤2 mol. %; 2 mol. %≤$Na_2O$–$Al_2O_3$≤6 mol. %; and 4 mol. %≤($Na_2O+K_2O$)–$Al_2O_3$≤10 mol. %.

In an alternative embodiment, the substrate may comprise an alkali aluminosilicate glass composition comprising: 2 mol % or more of $Al_2O_3$ and/or $ZrO_2$, or 4 mol % or more of $Al_2O_3$ and/or $ZrO_2$.

Where the substrate includes a crystalline substrate, the substrate may include a single crystal, which may include $Al_2O_3$. Such single crystal substrates are referred to as sapphire. Other suitable materials for a crystalline substrate include polycrystalline alumina layer and/or spinel ($MgAl_2O_4$).

Optionally, the crystalline substrate may include a glass ceramic substrate, which may be strengthened or non-strengthened. Examples of suitable glass ceramics may include $Li_2O$—$Al_2O_3$—$SiO_2$ system (i.e. LAS-System) glass ceramics, MgO—$Al_2O_3$—$SiO_2$ system (i.e. MAS-System) glass ceramics, and/or glass ceramics that include a predominant crystal phase including β-quartz solid solution, β-spodumene ss, cordierite, and lithium disilicate. The glass ceramic substrates may be strengthened using the chemical strengthening processes disclosed herein. In one or more embodiments, MAS-System glass ceramic substrates may be strengthened in $Li_2SO_4$ molten salt, whereby an exchange of $2Li^+$ for $Mg^{2+}$ can occur.

The substrate according to one or more embodiments can have a physical thickness ranging from about 100 µm to about 5 mm. Example substrate physical thicknesses range from about 100 µm to about 500 µm (e.g., 100, 200, 300, 400 or 500 µm). Further example substrate physical thicknesses range from about 500 µm to about 1000 µm (e.g., 500, 600, 700, 800, 900 or 1000 µm). The substrate may have a physical thickness greater than about 1 mm (e.g., about 2, 3, 4, or 5 mm). In one or more specific embodiments, the substrate may have a physical thickness of 2 mm or less or less than 1 mm. The substrate may be acid polished or otherwise treated to remove or reduce the effect of surface flaws.

Examples of articles that may include such anti-glare substrates include displays used in electronic devices such as laptops, mobile phones, smart phones, tablets, electronic readers, point of sale devices, inventory devices, navigation systems, automotive dashboards, automotive consoles, appliances (e.g., stoves, ranges, dishwashers, and refrigerators). The anti-glare substrates described herein may also be used in the housings of such electronic devices for decorative purposes. The anti-glare substrates may also be incorporated into architectural articles such as countertops, windows, elevators and the like).

A second aspect of this disclosure pertains to methods of forming the anti-glare substrates described herein. In one or more embodiments, the method includes providing a substrate having a surface and etching a portion of the surface to provide an etched surface and removing a portion of the etched surface to provide an anti-glare surface or a textured surface, as described herein.

In one or more embodiments, the etchant exhibits lower water solubility than known etchants. For example, in some embodiments, the etchant exhibits a water solubility of about 50 g/100 g water or less (e.g., about 40 g/100 g water or less, or about 30 g/100 g water or less). In some examples, the etchant includes a potassium salt and exhibits a water solubility of about 39.2 g/100 g water. The potassium salt may include KCl, soluble inorganic potassium salts (e.g., $KNO_3$, $K_2SO_4$ or combinations thereof), water-soluble organic salts (e.g., potassium acetate) and combinations thereof. In one or more specific embodiments, the etchant may have the composition $KHF_2$ or may include a combination of salts, which together have active components including potassium ions, fluoride ions and a low pH.

The etchant may include potassium salt in an amount in the range from about 0.1 wt % to about 20 wt %, from about 0.1 wt % to about 18 wt %, from about 0.1 wt % to about 16 wt %, from about 0.1 wt % to about 14 wt %, from about 0.1 wt % to about 12 wt %, from about 1 wt % to about 20 wt %, from about 2 wt % to about 20 wt %, from about 4 wt % to about 20 wt %, from about 6 wt % to about 20 wt %, from about 8 wt % to about 20 wt % from about 10 wt % to about 20 wt % from about 12 wt % to about 20 wt %, from about 5 wt % to about 15 wt % or from about 5 wt % to about 10 wt %.

In some embodiments, when the concentration of the potassium salt is less than about 5 wt % (e.g. about 2 wt %), the precipitate formation is insufficient and the desired textured surface cannot be formed. In some embodiments, when the potassium salt concentration is greater than about 10 wt %, the etchant is less uniform. In one or more embodiments, the etchant includes KCl in an amount in the range from about 5 wt % to about 10 wt %.

In some embodiments, the etchant includes a fluoride containing acid. The fluoride containing acid may be present in an amount in the range from about 0.5 wt % to about 6 wt %, from about 1 wt % to about 6 wt %, or from about 1 wt % to about 3 wt %. Examples of suitable fluoride containing acids include hydrofluoric acid (HF) and ammonium bifluoride ($NH_4HF_2$). Without being bound by theory, and as described more fully below, the fluoride containing acid etches the substrate and generates a precipitate of insoluble crystals including $SiF_6^{2-}$ ions by forming ions of the precipitate on the surface of the substrate. When the concentration of the fluoride containing acid is less than about 1 wt % or less than about 0.5 wt %, the etch rate is significantly reduced and the etchant cannot generate sufficient $SiF_6^{2-}$ ions to form crystals. This results in a textured surface that that has reduced surface roughness, low PPDr values, and DOI values approaching 100. When the fluoride containing acid concentration in the etchant is greater than about 6 wt %, the desirable textured surface also cannot be achieved because the etchant removes the insoluble crystals without forming the desired textured surface. Accordingly, in some embodiments, the etchant includes HF as the fluoride containing acid in an amount in the range from about 1 wt % to about 3 wt %.

The etchant may include an organic solvent. The organic solvent may be present in the etchant in an amount in the range from about 0 wt % to about 40 wt %, from about 1 wt % to about 40 wt %, from about 5 wt % to about 40 wt %, from about 10 wt % to about 40 wt %, from about 1 wt % to about 35 wt %, from about 1 wt % to about 30 wt %, from about 1 wt % to about 25 wt %, or from about 10 wt % to about 25 wt %. Examples of suitable organic solvents include one or more of propylene glycol, acetic acid, ethanol, propanol, and other solvents miscible in water.

In some instances, the etchant may be substantially free of ammonium salt. As used herein, the phrase "substantially free" means not intentionally added or present in an amount of less than about 0.01 wt %.

The etchant may have a viscosity enabling spray application of the etchant on the surface of the substrate.

In one or more embodiments, the method includes generating a precipitate on the surface of the substrate on which the etchant is applied and forming an etched surface. In some embodiments, the method includes disposing or maintaining the etchant on the surface until a sufficient number and size of precipitates are formed and the desired etched surface is formed. In other words, the application of an etchant includes an in situ precipitate formation (forming a precipitate or mask on the surface of the substrate) and etching process, by which the pattern of the precipitate or mask is transferred onto the surface of the substrate.

In one or more embodiments, the method includes applying the etchant and leaving it on the surface for a duration of up to and including about 20 minutes, up to and including about 18 minutes, up to and including about 16 minutes, up to and including about 14, up to and including about 12 minutes, up to and including about 10 minutes, up to and including about 8 minutes, up to and including about 6 minutes, up to and including about 5 minutes, or up to and including about 4 minutes.

The precipitate or mask may include a plurality of insoluble crystals. In one or more embodiments, the plurality of insoluble crystals are densely packed or disposed on the surface in a dense configuration (e.g., with limited, minimized or no space between the crystals). In one or more embodiments, the crystals should have an average cross-sectional dimension in the range from about 1 micrometer to about 10 micrometers. In some embodiments, the insoluble crystals exhibit a water solubility of less than about 10 g/100 g or water (e.g., about 1 g/100 g of water or less, or about 0.1 g/100 g of water or less). The insoluble crystals may include potassium and may comprise any one or more of $K_2SiF_6$ and $K_3AlF_6$. In such embodiments, the water solubility of the potassium-containing insoluble crystals may be about 0.084 g/100 g water.

When compared to known, ammonium-containing etchants that utilize $NH_4^+$ cations (e.g., etchants such as $NH_4F$, $NH_4HF_2$ and/or other ammonium salts), the etchants described herein utilize potassium salt and $K^+$ cations to generate insoluble crystals on the substrate surface, as illustrated by Equations 4 and 6. Equations 4 and 5 illustrate the generation of a precipitate having greater water solubility, using known ammonium-containing etchants that utilize $NH_4^+$ cations.

$$SiO_2 + 6HF \rightarrow SiF_6^{2-} + 2H_2O + 2H^+ \quad (4)$$

$$2NH_4^+ + SiF_6^{2-} \rightarrow (NH_4)_2SiF_6 (\text{insoluble}) \downarrow \quad (5)$$

$$2K^+ + SiF_6^{2-} \rightarrow K_2SiF_6 (\text{insoluble}) \downarrow \quad (6)$$

The insoluble crystals including potassium (and generated using the etchants of one or more embodiments of this disclosure) exhibit much lower water solubility than the known precipitates (such as ammonium precipitates generated using known ammonium-containing etchants). Specifically, the insoluble crystals generated by the etchant of one or more embodiments of this disclosure include $K_2SiF_6$, which exhibit a water solubility of about 0.084 g/100 g water; whereas known ammonium-containing etchants that utilize $NH_4^+$ cations generate crystals such as $(NH_4)_2SiF_6$, which exhibit a water solubility of about 22.7 g/100 g water, as shown in Table 1. Without being bound by theory, it is believed that reducing the water solubility of precipitates provides an anti-glare surface exhibiting reduced sparkle.

TABLE 1

Comparison of a known ammonium-based etchant that utilize $NH_4^+$ cations and etchants according to one or more embodiments of this disclosure.

| Etchant | Cation of etchant | Etchant formula | Etchant solubility (g/100 g water) | Precipitate | Precipitate solubility (g/100 g water) |
|---|---|---|---|---|---|
| Comparative | $NH_4^+$ | $NH_4HF_2$ | 60.2 | $(NH_4)_2SiF_6$ | 22.7 |
| Potassium based etchant | $K^+$ | $KHF_2$ | 39.2 | $K_2SiF_6$ | 0.084 |

Figure 2A:
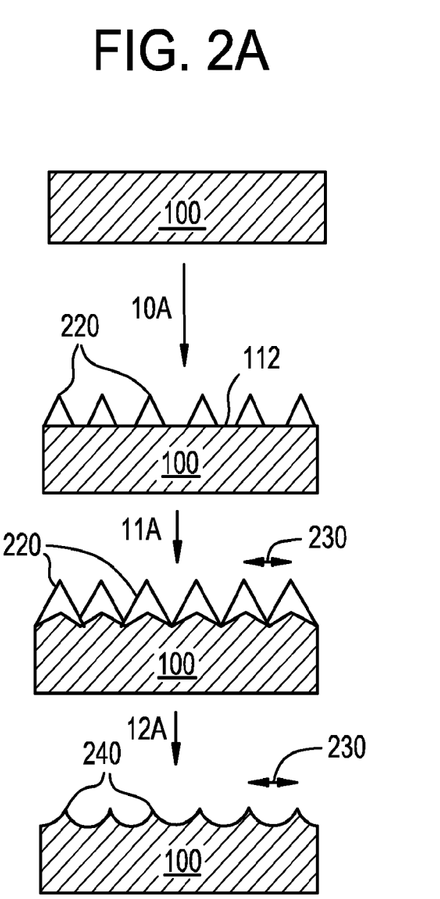
FIG. 2A is a process flow diagram showing a method of forming the textured surface of one or more embodiments.
Figure 2B:
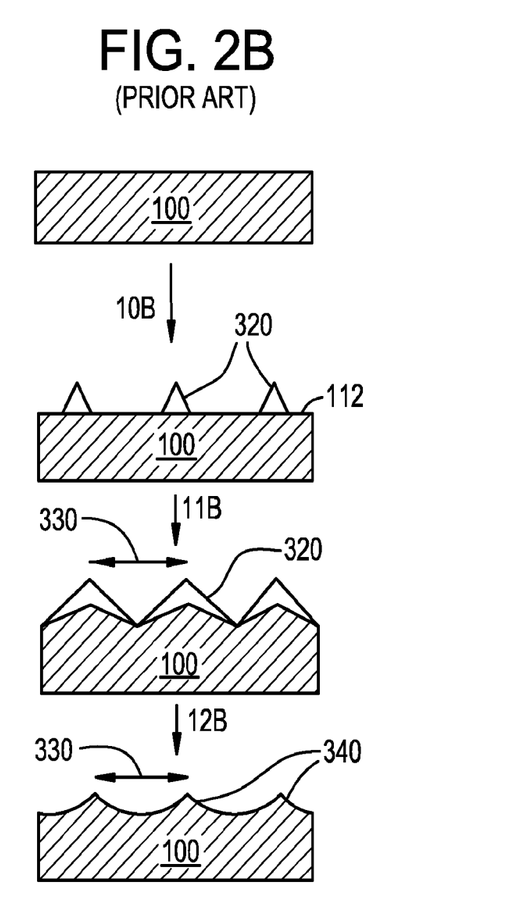
FIG. 2B is a process flow diagram shown a known method of forming known textured surfaces.

Due to the lower water solubility exhibited by the potassium crystals, a greater number of crystals can be generated from the etchants described herein. FIGS. 2A and 2B illustrate the generation and growth of the crystals according to one or more embodiments of this disclosure and the generation and growth of crystals according to known methods that utilize an ammonium-based etchant (which in turn, utilizes $NH_4^+$ cations). As shown in FIGS. 2A and 2B, the number of the crystals on substrate surface can influence the maximum size of the crystals and the size of the surface features on the resulting anti-glare surface. For illustration, a glass substrate 100 is utilized; however, it is noted that the substrate may include a crystalline substrate. Referring to FIG. 2A, the application of the etchant of one or more embodiments of this disclosure (10A) forms more crystals 220 on glass surface 112, which grow (11A) but remain relatively small in size, and provide smaller spaces between the crystals 230. Without being bound by theory, it is believed that the lower water solubility of the crystals 220

(specifically, crystals that include $K_2SiF_6$) enables the rapid formation of crystal seeds at a higher density. The crystal seeds grow larger but only to limited sizes due to the higher density of the crystal seeds. When the etchant of one or more embodiments is removed and a portion of the surface 112 of the glass is removed (12A), the resulting anti-glare surface has features 240 having a smaller size (i.e., having a size that corresponds to the size of the spaces between the crystals 230). The smaller features 240 provide an anti-glare surface that exhibits low sparkle.

For comparison and referring to FIG. 2B, the application of a known ammonium-based etchant that utilizes $NH_4^+$ cations (10B) forms fewer crystals 320 on the surface of the glass 112 and their growth (11B) is unlimited (due to fewer crystals on the surface). The resulting crystal size is larger and thus larger spaces are formed between the crystals 330. When the known etchant is removed and a portion of the surface 112 of the glass substrate is removed (12B), the resulting anti-glare surface has features 340 with larger sizes (i.e., having a size that corresponds to the size of the space between the crystals 23). The larger features 340 provide an anti-glare surface that exhibit greater sparkle.

Without being bound by theory, it is believed the use of a propylene glycol organic solvent further reduces the water solubility of the potassium crystals, and facilitates the generation of more crystals (formed at 10A in FIG. 2A). Moreover, propylene glycol is also believed to reduce the feature size and thus the sparkle exhibited by the resulting anti-glare surface.

In some embodiments, the etchant may include a small amount of ammonium fluoride ($NH_4F$). Without being bound by theory, such other salts do not significantly influence the formation of small crystals by potassium salts. In yet other embodiments, the etchant may include an insoluble particle or particles and optionally, a surfactant.

The method includes removing the etchant and precipitate after a desired amount and/or concentration of insoluble crystals are formed or a desired average size and size distribution of insoluble crystals are formed. The etchant may be removed by exposing the etchant to a cleaning solution and rinsing with DI water. In some embodiments, the cleaning solution may include $H_2SO_4$ having a concentration of about 10 wt % or less (e.g., about 8 wt % or less, about 6 wt % or less, about 5 wt % or less, about 4 wt % or less, or about 3 wt % or less). The etchant may be exposed to the cleaning solution for a duration of time sufficient to remove the etchant and the precipitate (or insoluble crystals) (e.g., about 10 minutes or less, about 8 minutes or less, about 6 minutes or less, about 5 minutes or less or about 4 minutes or less). The removal of the etchant and precipitate removes portions of the surface that do not include any insoluble crystals, forming an etched surface having small features (i.e., 140, FIG. 2A).

In some embodiments, the method includes removing a portion of the etched surface using a chemical polishing solution or other means known in the art to provide an anti-glare surface exhibiting the low sparkle, low DOI and low transmission haze, described herein. Specifically, the etched surface or a portion thereof is exposed to the chemical polishing solution for a duration of time to remove a portion of the etched surface. In some embodiments, a surface thickness of up to about 100 micrometers of the etched surface may be removed. In some instances, about 40 micrometers to about 100 micrometers of the etched surface may be removed. The removal may be controlled by the concentration of the chemical polishing solution or the exposure time of the etched surface to the chemical polishing solution. The chemical polishing solution may include hydrofluoric acid, a mineral acid (e.g., hydrochloric acid (HCl), and $H_2SO_4$), or a combination thereof.

Figure 3:
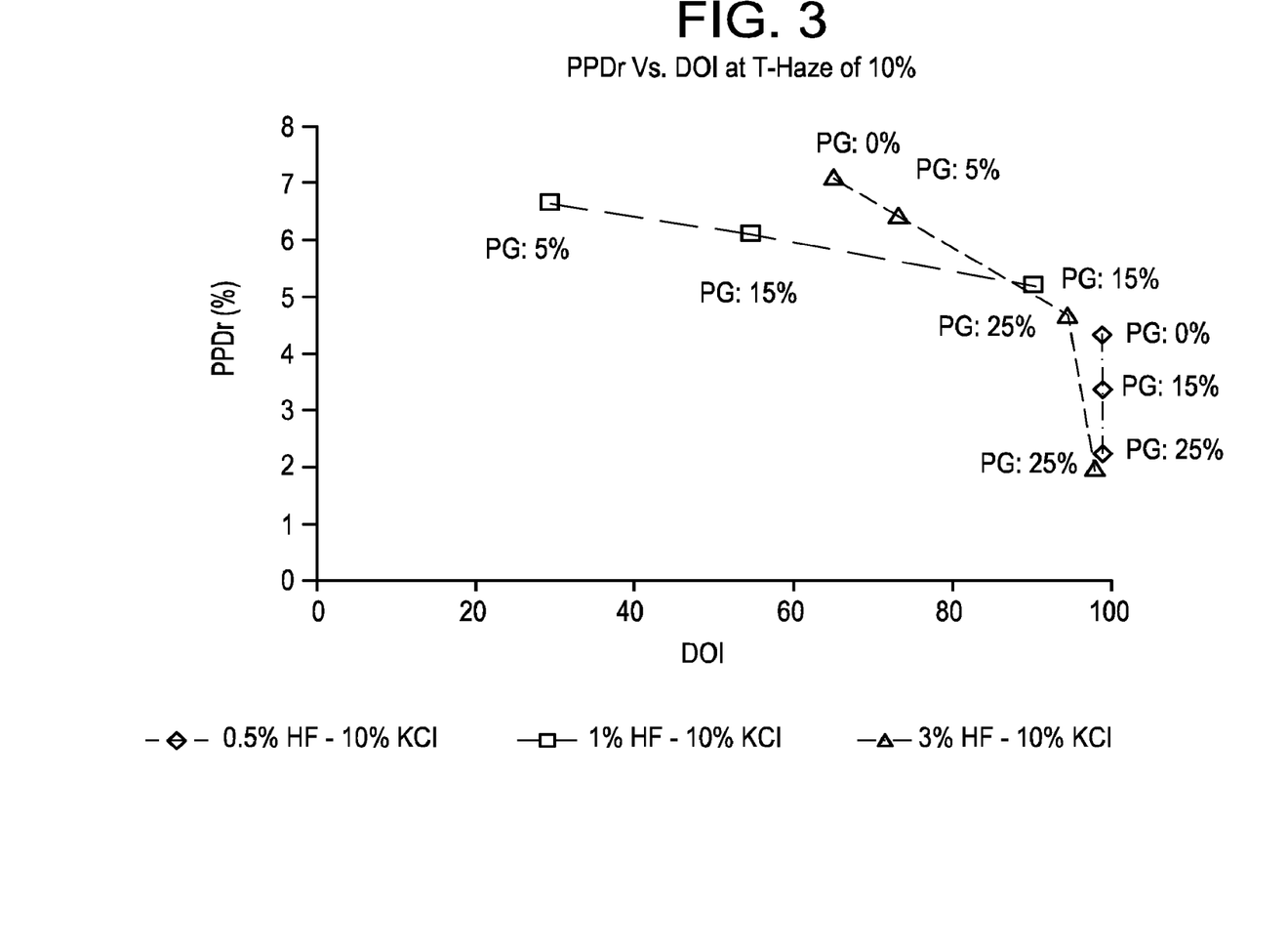
FIG. 3 is a graph showing the PPDr and DOI measurements achievable at a transmission haze of 10% of one or more embodiments.
Figure 4:
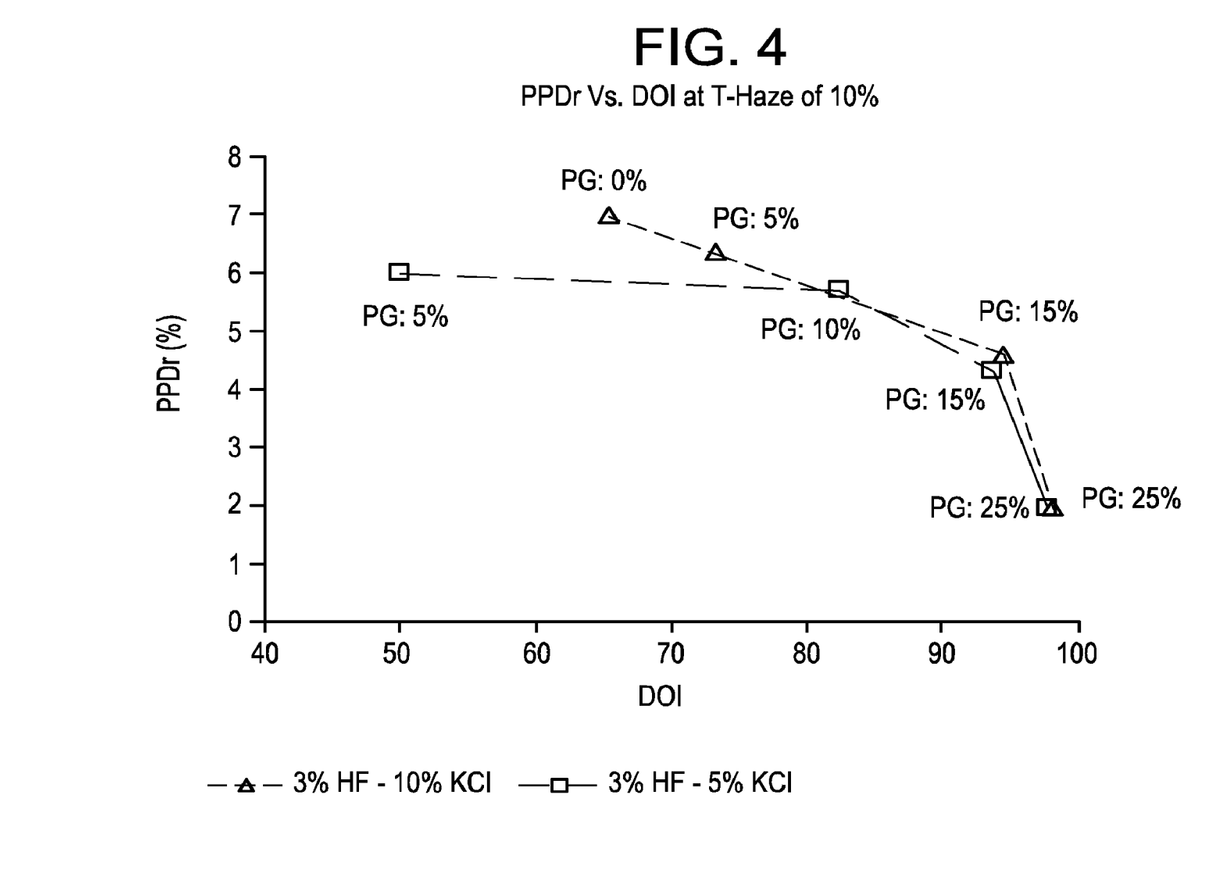
FIG. 4 is a graph showing the PPDr and DOI measurements achievable at a transmission haze of 10%.

In one or more embodiments, the etchants described herein can provide a substrate with a textured surface that exhibits desirable PPDr and DOI values, which can be tuned by varying the concentrations of the components of the etchant, within the ranges provided herein. For example, the resulting substrates according to one or more embodiments may exhibit a transmission haze of about 10%, a PPDr value in the range from about 4.5 to 7, and DOI value from in the range from about 30 to about 100, as shown in FIGS. 3 and 4. As shown in FIGS. 3 and 4, reduced concentrations of the organic solvent can reduce DOI but could increase PPDr. Moreover, variations in the fluoride-containing acid could also influence PPDr and DOI values. However, the embodiments disclosed herein exhibit optimized combinations of transmission haze, PPDr and DOI. As shown in FIG. 3, when the concentration of the fluoride-containing acid (HF) is less than about 1 wt %, the substrate may not be sufficiently textured and the DOI value tends to be high (e.g., close to 100%); however, the PPDr value may be between 2-4.5%. When the concentration of the fluoride-containing acid (HF) is in the range from about 1 wt % to about 3 wt %, increasing the concentration of the organic solvent reduces PPDr value, and increases the DOI value. As specifically shown in FIG. 4, when the organic solvent concentration is greater than about 10 wt %, varying the potassium salt (KCl) concentration from about 5 wt % to about 10 wt % does not significantly influence the correlation of PPDr and DOI of the substrate. When the organic solvent concentration is less than about 10 wt %, decreasing the potassium salt (KCl) concentration can reduce the PPDr value.

In one or more embodiments, the method may include applying a coating on the textured surface. In some instances, reflection from the anti-glare surface may be reduced by application of an anti-reflective coating on the surface. In other embodiments, scratch-resistance may be imparted to the textured surface by applying a scratch-resistant coating on the surface.

Prior to, during and after the formation of the textured surface, as described herein, the substrate may be cleaned using various known cleaning solutions and methods (e.g., in-line cleaning, acid etching etc.).

EXAMPLES

Various embodiments will be further clarified by the following examples.

Example 1

In Example 1, a glass substrate having a nominal composition of about 69 mol % $SiO_2$, 8.5 mol % $Al_2O_3$, 14 mol % $Na_2O$, 1.2 mol % $K_2O$, 6.5 mol % MgO and 0.5 mol % CaO, and about 0.2 mol % $SnO_2$, was cleaned using a cleaning solution including about 2.5 wt % hydrofluoric acid and 1.8 wt % hydrochloric acid for about 1 minute. The cleaned glass was rinsed in DI water and then a major surface of the substrate was exposed to an etchant for 8 minutes to form an etched surface. The etchant included about 1 wt % HF, 10 wt % KCl, and 25 wt % propylene glycol. The etched surface was then cleaned by soaking the substrate in a solution of 5.3 wt % $H_2SO_4$ for 5 minutes and then rinsed with DI water. The etched surface was then chemically polished to different depths (or until specific thicknesses of the etched surface are removed) using a chemical polishing solution of 2.5 wt % HF and 1.8 wt % HCl, as shown in Table 2. The properties of the resulting textured surface.

TABLE 2

Properties of Example 1, after removal of specific thicknesses of the etched surface.

| Thickness of etched surface removed (μm) | T-Haze (%) | DOI | PPDr (%) | Gloss (60°) | Surface Roughness (Ra, nm) |
|---|---|---|---|---|---|
| 0 | 46.5 | 91.3 | 3.28 | 19.1 | 186.5 |
| 4 | 56.7 | 0 | 3.77 | 15.8 | 284.0 |
| 12 | 32.3 | 62.2 | 4.1 |  | 260.5 |
| 25 | 20.9 | 74.5 | 4.74 | 32.7 | 190.7 |
| 40 | 16.2 | 82.4 | 4.97 | 41 | 163.1 |
| 60 | 9.73 | 81.8 | 4.62 | 51 | 141.7 |
| 100 | 6.11 | 84.9 | 5.29 | 68.8 | 114.0 |

As shown in Table 2, after removal of about 60 micrometers of the etched surface, the substrate exhibited a T-haze of about 10%, a PPDr value of about 4. And a DOI of about 826. After removal of about 100 micrometers of the etched surface, the substrate exhibited a T-haze level of about 6%, a PPDr value of about 5.3% and a DOI of about 85.

Figure 5:
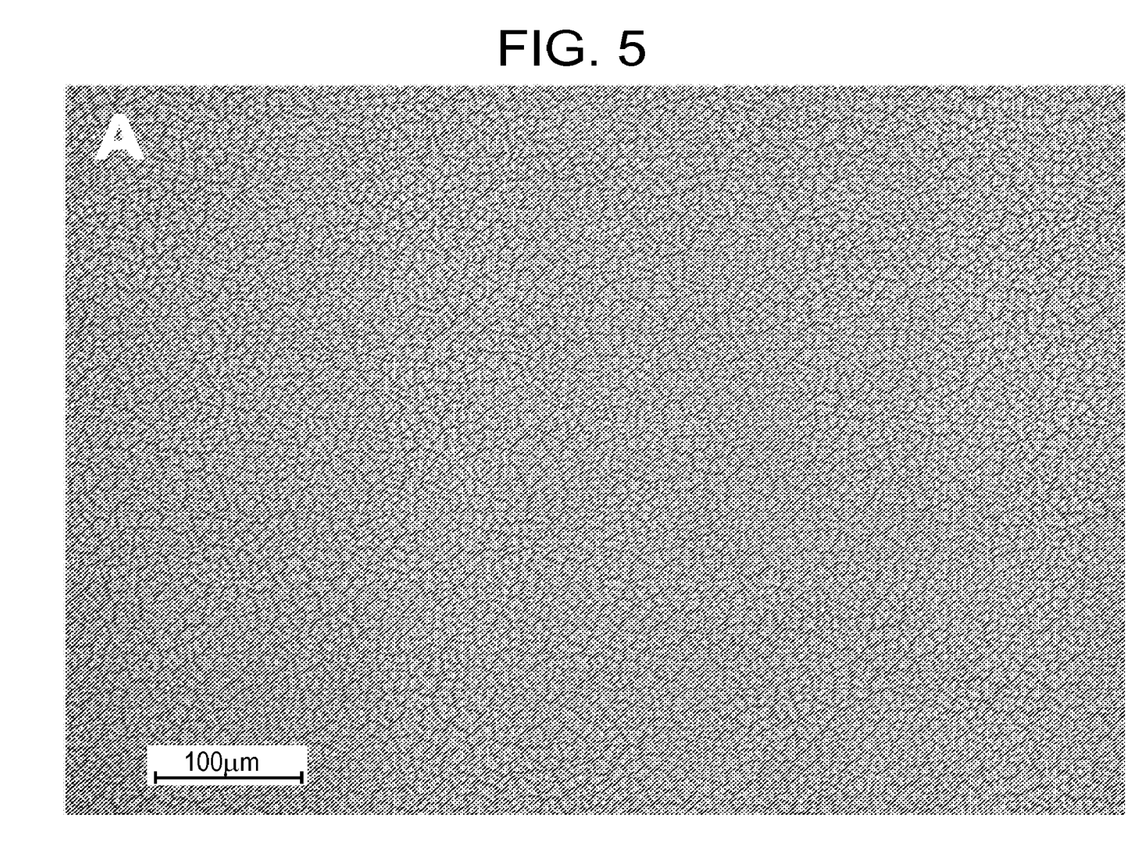
FIG. 5 is an image of the etched surface of Example 1, taken by Nikon Optical Microscope, at 200× magnification.
Figure 6:
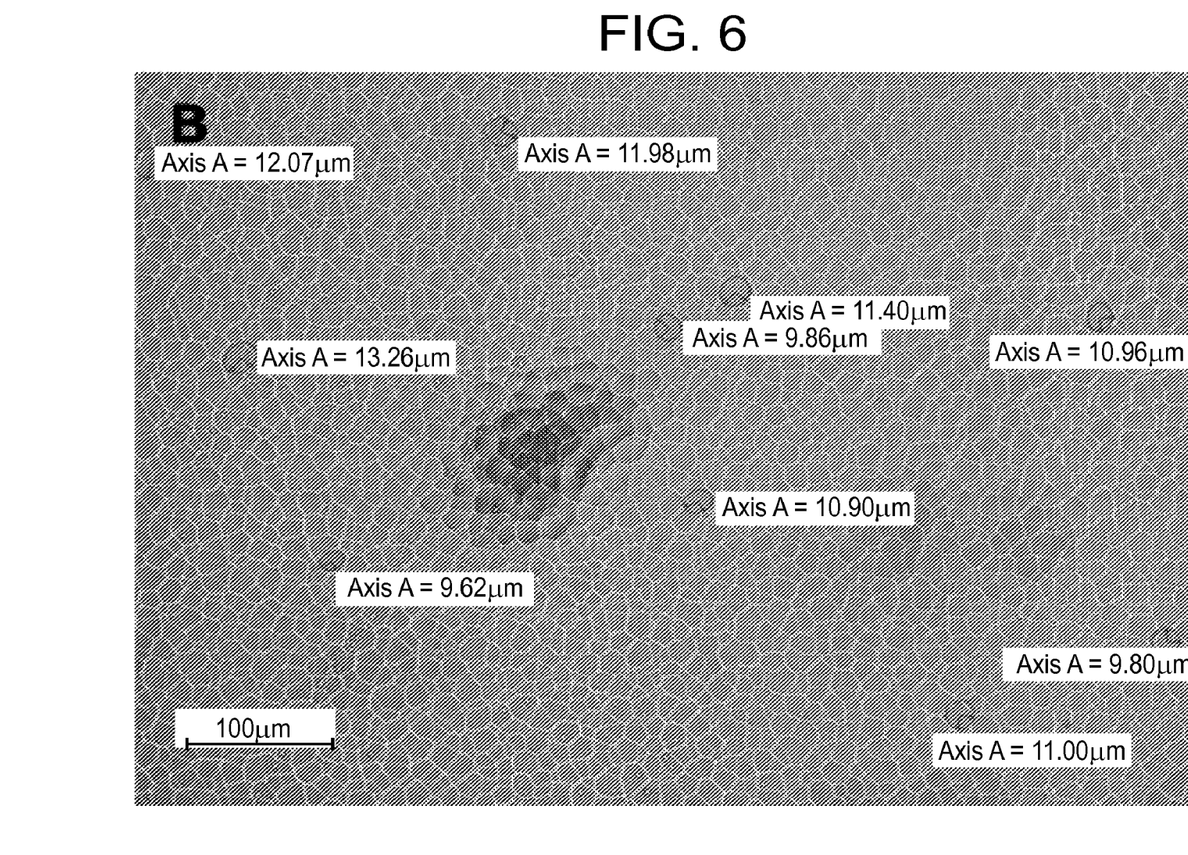
FIG. 6 is an image of the textured surface of Example 1, taken by Nikon Optical Microscope, at 200× magnification.

FIG. 5 is an image of the etched surface, taken at 200× magnification, using an optical microscope, supplied by Nikon. FIG. 6 is an image of the textured surface after chemical polishing and removal of about 100 micrometers of the etched surface, taken at 200× magnification using the same optical microscope. The scale bar shown in FIGS. 3 and 4 is for 100 micrometers. In FIG. 6, the features were selected for measurement of their respective cross-sectional dimensions, as defined herein, and the average cross-sectional dimension was calculated (based on the measurements of 20 different features) to about 22 micrometers.

Example 2

Example 2 utilized the same glass substrate as Example 1. The substrate was cleaned using the same cleaning solution and method as used in Example 1. The cleaned glass was rinsed in DI water and then a major surface of the substrate was exposed to an etchant for 8 minutes to form an etched surface. The etchant included about 1 wt % HF, 5 wt % KCl, and 25 wt % propylene glycol. The etched surface was then cleaned by soaking the substrate in a solution of 5.3 wt % $H_2SO_4$ for 5 minutes and then rinsed with DI water. The etched surface was then chemically polished to different depths (or until specific thicknesses of the etched surface are removed) using the same chemical polishing solution used in Example 1, as shown in Table 3. The properties of the resulting textured surface.

TABLE 3

Properties of Example 2, after removal of specific thicknesses of the etched surface.

| Thickness of etched surface removed (μm) | T-Haze (%) | DOI | PPDr (%) | Gloss (60°) |
|---|---|---|---|---|
| 0 | 37.8 | 89.2 | 3.36 | 20.1 |
| 4 | 47 | 65.8 | 3.86 | 18.3 |
| 12 | 30.4 | 58 | 4.38 |  |
| 5 | 20.3 | 68.1 | 4.67 | 31.6 |
| 40 | 15.6 | 71.1 | 5.18 | 37.2 |
| 60 | 10.4 | 76.7 | 5.14 | 46.8 |
| 100 | 8.27 | 77.4 | 5.37 | 57.6 |

As shown in Table 3, after removal of about 60 micrometers of the etched surface, the substrate exhibited a T-haze level of about 10%, a PPDr value of about 5.1 and a DOI of less than about 77. After removal of about 100 micrometers of the etched surface, the substrate exhibited a T-haze level of about 8%, a PPDr value of about 5 and a DOI of about 77. The average cross-sectional dimension of the features of the resulting textured surface was about 23 micrometers.

Example 3

Example 3 utilized the same glass substrate as Example 1. The substrate was cleaned using the same cleaning solution and method as used in Example 1. The cleaned glass was rinsed in DI water and then a major surface of the substrate was exposed to an etchant for 8 minutes to form an etched surface. The etchant included about 6 wt % HF, 15 wt % KCl. The etchant did not include an organic solvent or, more specifically, propylene glycol. The etched surface was then cleaned by soaking the substrate in a solution of 5.3 wt % $H_2SO_4$ for 5 minutes and then rinsed with DI water. The etched surface was then chemically polished to different depths (or until specific thicknesses of the etched surface are removed) using the same chemical polishing solution used in Example 1, as shown in Table 4. The properties of the resulting textured surface.

TABLE 4

Properties of Example 3, after removal of specific thicknesses of the etched surface.

| Thickness of etched surface removed (μm) | T-Haze (%) | DOI | PPDr | Gloss (60°) |
|---|---|---|---|---|
| 0 | 30.2 | 39 |  |  |
| 4 | 47.8 | 37.5 | 4.69 | 20.4 |
| 12 | 36.8 | 0 | 4.51 |  |
| 25 | 29.6 | 28.2 | 4.88 | 25.7 |
| 40 | 23 | 30.7 | 5.64 | 30.8 |
| 60 | 16.7 | 31.5 | 6.4 | 37 |
| 100 | 8.88 | 33.3 | 8.4 | 48 |

As shown in Table 4, after removal of about 60 micrometers of the etched surface, the substrate exhibited a T-haze level of about 17%, a PPDr value of about 6.4 and a DOI of less than about 32. After removal of about 100 micrometers of the etched surface, the substrate exhibited a T-haze level of about 8.9%, a PPDr value of about 8.44 and a DOI of about 33. The average cross-sectional dimension of the features of the resulting textured surface was about 33 micrometers.

Example 4

Example 4 utilized a glass substrate having a nominal composition of about 65 mol % $SiO_2$, 5 mol % $B_2O_3$, 14 mol % $Al_2O_3$, 14 mol % $Na_2O$, 2.4 mol % MgO, and about 0.08 mol % $SnO_2$. The substrate was cleaned using the same cleaning solution and method as used in Example 1. The cleaned glass was rinsed in DI water and then a major surface of the substrate was exposed to an etchant for 8 minutes to form an etched surface. The etchant included about 6 wt % HF, 10 wt % KCl, and 25 wt % of propylene glycol. The etched surface was then cleaned by soaking the substrate in a solution of 5.3 wt % $H_2SO_4$ for 5 minutes and then rinsed with DI water. The etched surface was then chemically polished to different depths (or until specific thicknesses of the etched surface are removed) using the same chemical polishing solution used in Example 1, as shown in Table 5. The properties of the resulting textured surface.

TABLE 5

Properties of Example 4, after removal of specific thicknesses of the etched surface.

| Thickness of etched surface removed (μm) | T-Haze (%) | DOI | PPDr (%) | Gloss (60°) |
|---|---|---|---|---|
| 0 | 65.2 | 93.9 | 3.82 | 12.8 |
| 20 | 26.7 | 88.1 | 4.55 | 32.0 |
| 40 | 13.3 | 90.3 | 5.16 | 54.4 |
| 60 | 8.6 | 88.7 | 5.56 | 71.1 |
| 100 | 4.6 | 92.3 | 5.88 | 91.6 |

As shown in Table 5, after removal of about 60 micrometers of the etched surface, the substrate exhibited a T-haze level of about 8.6%, a PPDr value of about 5.56 and a DOI of less than about 88.7. After removal of about 100 micrometers of the etched surface, the substrate exhibited a T-haze level of about 4.6%, a PPDr value of about 5.88 and a DOI of about 92.3. The average cross-sectional dimension of the features of the resulting textured surface was about 20 micrometers.

Example 5

Example 5 utilized the same glass substrate as Example 4, which was cleaned using the same cleaning solution and method as used in Example 1. The cleaned glass was rinsed in DI water and then a major surface of the substrate was exposed to an etchant for 16 minutes to form an etched surface. The etchant included about 1 wt % HF, 10 wt % KCl, and 25 wt % of propylene glycol. The etched surface was then cleaned by soaking the substrate in a solution of 5.3 wt % $H_2SO_4$ for 5 minutes and then rinsed with DI water. The etched surface was then chemically polished to different depths (or until specific thicknesses of the etched surface are removed) using the same chemical polishing solution used in Example 1, as shown in Table 6. The properties of the resulting textured surface.

TABLE 6

Properties of Example 5, after removal of specific thicknesses of the etched surface.

| Thickness of etched surface removed (μm) | T-Haze (%) | DOI | PPDr (%) | Gloss (60°) |
|---|---|---|---|---|
| 0 | 64.6 | 93.8 | 3.75 | 3.5 |
| 20 | 26.0 | 88.4 | 4.49 | 32.0 |
| 40 | 13.9 | 91.1 | 4.93 | 54.4 |
| 60 | 8.8 | 89.7 | 5.38 | 71.1 |
| 100 | 4.3 | 91.6 | 5.72 | 86.6 |

As shown in Table 6, after removal of about 60 micrometers of the etched surface, the substrate exhibited a T-haze level of about 8.8%, a PPDr value of about 5.38 and a DOI of less than about 89.7. After removal of about 100 micrometers of the etched surface, the substrate exhibited a T-haze level of about 4.3%, a PPDr value of about 5.72 and a DOI of about 91.6. The average cross-sectional dimension of the features of the resulting textured surface was about 20 micrometers.

Example 6

Examples 6A-6R included the same glass substrate as Examples 4 and 5 ("Substrate 1") and were prepared using the conditions shown below in Table 7. The DOI, PPDr and transmission haze was measured at different chemical polishing depths. The calculated DOI and PPDr values based on a transmission haze of 10% are shown in Table 8.

TABLE 7

Etchant composition, and measured DOI, PPDr and transmission haze values at different chemical polishing depths for Examples 6A-6R.

| | Etchant for glass roughening (wt %) | | | DOI (%) at chemical polishing depths (μm) | | | | PPDr (%) at chemical polishing depths (μm) | | | | Haze (%) at chemical polishing depths (μm) | | | |
|---|---|---|---|---|---|---|---|---|---|---|---|---|---|---|---|
| Ex. | HF | PG | KCl | 0 | 20 | 50 | 100 | 0 | 20 | 50 | 100 | 0 | 20 | 50 | 100 |
| 6A | 0.5 | 0 | 10 | 97.5 | 99.2 | 100 | 100 | 6.0 | 2.8 | 2.6 | 2.0 | 24.5 | 3.7 | 1.4 | 0.3 |
| 6B | 0.5 | 5 | 10 | 100 | 99.6 | 99.6 | 99.6 | 1.9 | 0.8 | 1.8 | 1.8 | 0.1 | 0.1 | 0.1 | 0.1 |
| 6C | 0.5 | 15 | 10 | 97.6 | 99.3 | 99.5 | 99.1 | 6.1 | 2.3 | 1.9 | 2.0 | 28.8 | 2.4 | 0.5 | 0.2 |
| 6D | 0.5 | 25 | 10 | 96.3 | 99.5 | 99.6 | 99.7 | 5.0 | 1.5 | 1.8 | 1.9 | 56.2 | 2.6 | 0.6 | 0.2 |
| 6E | 1 | 15 | 5 | 74.3 | 24.5 | 55.2 | 79.4 | 3.5 | 3.9 | 5.4 | 6.6 | 73.1 | 46.5 | 17.8 | 5.7 |
| 6F | 1 | 0 | 10 | 64.6 | 88.2 | 96.3 | 98.5 | 4.6 | 3.6 | 3.5 | 2.2 | 83.7 | 39.6 | 9.2 | 2.1 |
| 6G | 1 | 5 | 10 | 0.0 | 4.3 | 2.2 | 30.5 | 4.1 | 3.6 | 5.1 | 6.7 | 86.3 | 71.2 | 39.8 | 9.2 |
| 6H | 1 | 15 | 10 | 0.0 | 52.3 | 55.1 | 54.3 | 4.5 | 4.0 | 4.2 | 7.1 | 85.2 | 47.3 | 26.1 | 5.7 |
| 6I | 1 | 25 | 10 | 93.8 | 88.4 | 89.7 | 91.6 | 3.8 | 4.5 | 5.4 | 5.7 | 64.6 | 26 | 8.8 | 4.3 |
| 6J | 3 | 0 | 5 | | | | 30.0 | | | | 10.9 | | | | 10.0 |
| 6K | 3 | 5 | 5 | 76.8 | 7.1 | 35.5 | 65.4 | 4.0 | 4.1 | 5.3 | 6.9 | 42.0 | 44.4 | 17.7 | 5.6 |
| 6L | 3 | 10 | 5 | 95.3 | 58.6 | 79.5 | 87.4 | 3.5 | 4.4 | 5.4 | 6.4 | 29.3 | 34.3 | 13.6 | 4.3 |
| 6M | 3 | 15 | 5 | 98.1 | 93 | 93.6 | 94.4 | 2.9 | 4.1 | 4.4 | 4.5 | 16.6 | 19.5 | 8.1 | 2.8 |
| 6N | 3 | 25 | 5 | 97.7 | | | | 2.0 | | | | 8.6 | | | |
| 6O | 3 | 0 | 10 | 94.7 | 17.3 | 43.3 | 70.7 | 3.7 | 3.9 | 5.3 | 7.9 | 58.7 | 60.5 | 25.2 | 6.8 |

TABLE 7-continued

Etchant composition, and measured DOI, PPDr and transmission haze values at different chemical polishing depths for Examples 6A-6R.

| | Etchant for glass roughening (wt %) | | | DOI (%) at chemical polishing depths (μm) | | | | PPDr (%) at chemical polishing depths (μm) | | | | Haze (%) at chemical polishing depths (μm) | | | |
|---|---|---|---|---|---|---|---|---|---|---|---|---|---|---|---|
| Ex. | HF | PG | KCl | 0 | 20 | 50 | 100 | 0 | 20 | 50 | 100 | 0 | 20 | 50 | 100 |
| 6P | 3 | 5 | 10 | 93.8 | 23.6 | 70.3 | 74.1 | 3.5 | 3.9 | 5.7 | 7.4 | 51.6 | 46.6 | 16.1 | 5.4 |
| 6Q | 3 | 15 | 10 | 97.9 | 93.8 | 94.3 | 94.6 | 3.0 | 4.0 | 4.9 | 5.5 | 35.2 | 25.6 | 8.8 | 3.0 |
| 6R | 3 | 25 | 10 | 98.0 | | | | 2.0 | | | | 11.6 | | | |

TABLE 8

Calculated DOI and PPDr values for Examples 6A-6R.

| Ex. | Input Haze | Calculated DOI (%) at 10% Haze | Calculated PPDr (%) at 10% Haze |
|---|---|---|---|
| 6A | 10.0 | 99.0 | 4.3 |
| 6B | 10.0 | 99.0 | 1.8 |
| 6C | 10.0 | 99.0 | 3.4 |
| 6D | 10.0 | 99.0 | 2.2 |
| 6E | 10.0 | 70.0 | 6.1 |
| 6F | 10.0 | 96.2 | 3.5 |
| 6G | 10.0 | 29.4 | 6.6 |
| 6H | 10.0 | 54.7 | 6.1 |
| 6I | 10.0 | 90.3 | 5.2 |
| 6J | 10.0 | 30.0 | 10.9 |
| 6K | 10.0 | 49.9 | 6.1 |
| 6L | 10.0 | 82.3 | 5.8 |
| 6M | 10.0 | 93.7 | 4.4 |
| 6N | 10.0 | 97.7 | 2.0 |
| 6O | 10.0 | 65.2 | 7.1 |
| 6P | 10.0 | 73.3 | 6.4 |
| 6Q | 10.0 | 94.3 | 4.7 |
| 6R | 10.0 | 98.0 | 2.0 |

Figure 7:
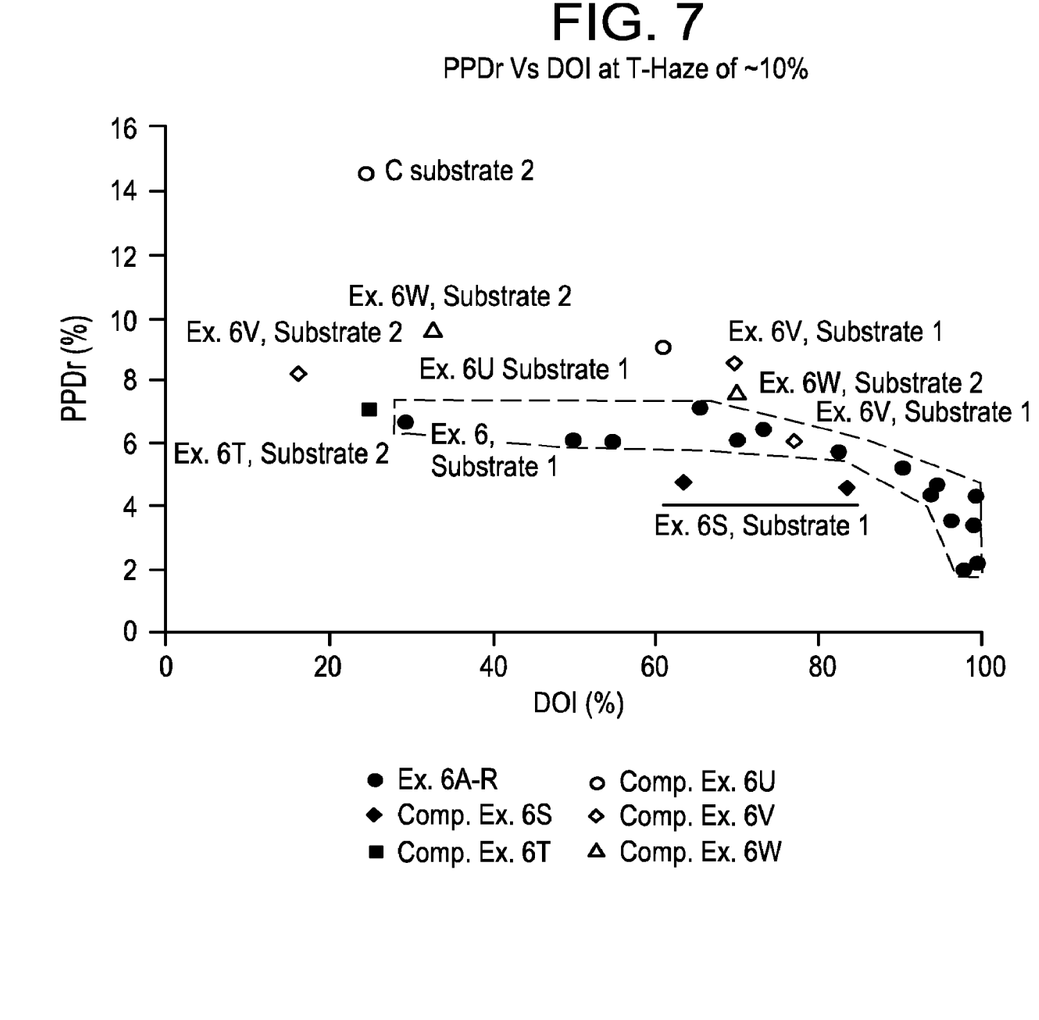
FIG. 7 is a graph showing the calculated PPDr and DOI measurements of Example 6 and comparative substrates.

The calculated DOI and PPDr values at transmission haze of 10% were plotted in FIG. 7. For comparison, substrates having the same composition as Substrate 1 or the same composition as the substrates used in Examples 1-3 ("Substrate 2") were subjected to known methods of forming a textured surface. The PPDr and DOI values at a transmission haze of about 10% of those comparative substrates are also shown in FIG. 7. The shaded portion of the graph of FIG. 7 (including solid circles) are collected data points (i.e., PPDr and DOI) from Table 8. Comparative Example 6S are substrates formed using a comparative cream (or sludge) etching process. Comparative Examples 6T and 6V represent substrates formed using an ammonium-salt based etchant. Comparative Example 6U represents substrates formed using a sand blasting and etching technique. Comparative Example 6W represents substrates formed using a sol-gel process.

It will be apparent to those skilled in the art that various modifications and variations can be made without departing from the spirit or scope of the invention.

What is claimed is:

1. A method of forming an antiglare surface comprising:
   etching a portion of a surface of a substrate with an etchant to provide an etched surface, the etchant exhibiting a water solubility of about 50 g/100 g water or less; and
   removing a portion of the etched surface to provide the anti-glare surface,
   wherein the substrate with the anti-glare surface exhibits a transmission haze 10% or less, and a pixel power deviation reference (PPDr) of about 6% or less, and the anti-glare surface exhibits a distinctiveness of image (DOI) of about 80 or less.

2. The method of claim 1, further comprising generating a plurality of insoluble crystals on the surface while etching a portion of the surface.

3. The method of claim 2, wherein the insoluble crystals comprise potassium.

4. The method of claim 2, wherein the insoluble crystals exhibit a water solubility of less than about 10 g/100 g water.

5. The method of claim 2, wherein the insoluble crystals comprise any one or more of $K_2SiF_6$ and $K_3AlF_6$.

6. The method of claim 1, wherein removing the portion of the etched surface comprises removing a thickness up to about 100 micrometers of the surface.

7. The method of claim 1, wherein removing the portion of the etched surface comprises exposing the surface to a chemical polishing solution.

8. The method of claim 1, wherein the etchant is removed prior to removing the portion of the etched surface.

9. The method of claim 1, wherein the etchant comprises a potassium salt in an amount in the range from about 1 wt % to about 20 wt %, and the potassium salt comprises any one or more of potassium chloride (KCl), potassium nitrate ($KNO_3$), potassium sulfate ($K_2SO_4$) and potassium acetate.

10. The method of claim 1, wherein the etchant further comprises an organic solvent and a fluoride containing acid, and wherein the organic solvent is present in an amount in the range from about 0 wt % to about 40 wt %.

11. The method of claim 1, wherein the etchant is substantially free of ammonium salt.

12. The method of claim 1, wherein the etchant further comprises any one or more of ammonium fluoride ($NH_4F$), an insoluble particle and a surfactant.

13. The method of claim 1, wherein the substrate comprises an amorphous substrate or a crystalline substrate, and wherein the amorphous substrate comprises a glass selected from the group consisting of soda lime glass, alkali aluminosilicate glass, alkali containing borosilicate glass and alkali aluminoborosilicate glass.

14. The method of claim 13, wherein the glass is chemically strengthened and comprises a compressive stress (CS) layer with a surface CS of at least 250 MPa extending within the chemically strengthened glass from a surface of the glass to a depth of layer (DOL) of at about 10 μm or greater.

15. The method of claim 14, wherein the anti-glare surface comprises a textured surface comprising plurality of concave features having an opening facing outwardly from the surface, wherein the opening comprises an average cross-sectional dimension of about 30 micrometers or less.

* * * * *

UNITED STATES PATENT AND TRADEMARK OFFICE
CERTIFICATE OF CORRECTION

PATENT NO. : 10,656,454 B2
APPLICATION NO. : 15/506053
DATED : May 19, 2020
INVENTOR(S) : Brandon Allen Bazemore et al.

It is certified that error appears in the above-identified patent and that said Letters Patent is hereby corrected as shown below:

In the Claims

In Column 19, Line 61, Claim 1, delete "antiglare" and insert -- anti-glare --, therefor.

Signed and Sealed this
Twenty-second Day of September, 2020

Andrei Iancu
*Director of the United States Patent and Trademark Office*